United States Patent
Yang

(10) Patent No.: US 12,382,365 B2
(45) Date of Patent: Aug. 5, 2025

(54) INFORMATION TRANSMISSION METHOD AND COMMUNICATION DEVICE

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 438 days.

(21) Appl. No.: 17/915,856

(22) PCT Filed: Apr. 2, 2020

(86) PCT No.: PCT/CN2020/083077
§ 371 (c)(1),
(2) Date: Sep. 29, 2022

(87) PCT Pub. No.: WO2021/196146
PCT Pub. Date: Oct. 7, 2021

(65) Prior Publication Data
US 2023/0145738 A1    May 11, 2023

(51) Int. Cl.
*H04B 17/382* (2015.01)
*H04B 17/40* (2015.01)
(Continued)

(52) U.S. Cl.
CPC .......... *H04W 40/22* (2013.01); *H04B 17/382* (2015.01); *H04B 17/40* (2015.01); *H04W 24/02* (2013.01); *H04W 24/10* (2013.01); *H04W 40/12* (2013.01); *H04W 40/246* (2013.01); *H04W 40/248* (2013.01); *H04W 72/25* (2023.01);
(Continued)

(58) Field of Classification Search
CPC .. H04B 17/0082–409; H04W 4/30–80; H04W 8/22–245; H04W 24/02–10; H04W 40/005–38; H04W 60/005–06; H04W 72/02–569; H04W 76/10–50; H04W 84/005–22; H04W 88/02–12; H04W 92/02–10; H04W 92/16–18
See application file for complete search history.

(56) References Cited

U.S. PATENT DOCUMENTS

2018/0124674 A1    5/2018    Vutukuri et al.
2023/0074899 A1*   3/2023    Wang .................... H04W 40/22

FOREIGN PATENT DOCUMENTS

CN      107771410 A        3/2018
WO    WO 2016162722 A1    10/2016
(Continued)

OTHER PUBLICATIONS

Indian Patent Application No. 202247061957, Office Action dated Jan. 5, 2023, 5 pages.
(Continued)

*Primary Examiner* — Timothy J Weidner
(74) *Attorney, Agent, or Firm* — Cozen O'Connor

(57) ABSTRACT

An information transmission method and apparatus are disclosed. A first UE receives network information that is respectively sent by one or more second UEs and is associated with a network state of each second UE; sends the network information to a base station; and receives first indication information from the base station. The first indication information indicates at least one second UE in the one or more second UEs to operate in a first working state.

20 Claims, 7 Drawing Sheets

(51) Int. Cl.
  *H04W 24/02* (2009.01)
  *H04W 24/10* (2009.01)
  *H04W 40/12* (2009.01)
  *H04W 40/22* (2009.01)
  *H04W 40/24* (2009.01)
  *H04W 72/25* (2023.01)
  *H04W 72/40* (2023.01)
  *H04W 76/14* (2018.01)
  *H04W 76/20* (2018.01)
  *H04W 84/02* (2009.01)
  *H04W 88/04* (2009.01)
  *H04W 88/08* (2009.01)
  *H04W 92/02* (2009.01)
  *H04W 92/10* (2009.01)
  *H04W 92/18* (2009.01)

(52) U.S. Cl.
  CPC ........... *H04W 72/40* (2023.01); *H04W 76/14* (2018.02); *H04W 76/20* (2018.02); *H04W 84/02* (2013.01); *H04W 88/04* (2013.01); *H04W 88/08* (2013.01); *H04W 92/02* (2013.01); *H04W 92/10* (2013.01); *H04W 92/18* (2013.01)

(56) References Cited

FOREIGN PATENT DOCUMENTS

| WO | WO 2018129875 A1 | 7/2018 |
| WO | WO 2018201487 A1 | 11/2018 |

OTHER PUBLICATIONS

Russian Patent Application No. 2022128171, Office Action dated Mar. 28, 2023, 8 pages.
Russian Patent Application No. 2022128171, English translation of Office Action dated Mar. 28, 2023, 7 pages.
European Patent Application No. 20928982.6, Search and Opinion dated Apr. 11, 2023, 10 pages.
PCT/CN2020/083077 International Search Report dated Dec. 31, 2020; 2 pages.

* cited by examiner

INFORMATION TRANSMISSION METHOD AND COMMUNICATION DEVICE

CROSS-REFERENCE TO RELATED APPLICATION

This application is the US national phase application of International Application No. PCT/CN2020/083077, filed on Apr. 2, 2020, the entire contents of which are incorporated herein by reference for all purposes.

TECHNICAL FIELD

The disclosure relates to the field of wireless communication technologies, but is not limited to the field of wireless communication technologies, and in particular, to information transmission methods, apparatuses, communication devices, and storage medium.

BACKGROUND

In order to support direct communication between user equipment (UE) in a cellular mobile communication network, a sidelink communication mode is introduced, and the interface between UEs is referred to as PC-5. Typically, a UE supports three transmission modes on the sidelink: unicast, multicast and broadcast.

As shown in FIG. 1, through the sidelink transmission mode, one UE can communicate with a base station by relaying that communication through another UE. A UE that is not connected to the base station is called a remote UE, and a UE that provides a relay function is called a relay UE. The remote UE communicates with the relay UE through the sidelink.

SUMMARY

According to a first aspect of the present disclosure, an information transmission method is provided. The method is applied to a first UE, and includes:
  receiving network information associated with a network state of a second UE sent by the second UE;
  sending the network information to a base station;
  receiving first indication information sent by the base station, wherein the first indication information indicates the second UE to operate in a first working state.

According to a second aspect of the present disclosure, an information transmission method is provided. The method is applied to a second UE, and includes:
  sending network information associated with a network state of the second UE to a first UE;
  receiving first indication information from a base station, wherein the first indication information indicates the second UE to operate in a first working state.

According to a third aspect of the present disclosure, an information transmission method is provided. The method is applied to a base station, and includes:
  receiving network information sent by a first UE and associated with a network state of a second UE;
  sending first indication information, wherein the first indication information indicates the second UE to operate in the first working state.

According to a fourth aspect of embodiments of the present disclosure, a communication device is provided, including a processor, a transceiver, a memory, and an executable program stored on the memory and capable of being run by the processor, wherein when the processor runs the executable program, steps of the information transmission method provided in the first aspect or the second aspect or the third aspect are implemented.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The terms used in embodiments of the present disclosure are only for the purpose of describing particular embodiments, and are not intended to limit the embodiments of the present disclosure. As used in the embodiments of the present disclosure and the appended claims, the singular forms "a," "the," and "said" are intended to include the plural forms as well, unless the context clearly dictates otherwise. It will also be understood that the term "and/or" as used herein refers to and includes any and all possible combinations of one or more of the associated listed items.

It should be understood that although the terms first, second, third, etc. may be used in embodiments of the present disclosure to describe various pieces of information, such information should not be limited to these terms. These terms are only used to distinguish the same type of information from each other. For example, without departing from the scope of the embodiments of the present disclosure, the first information may also be referred to as the second information, and similarly, the second information may also be referred to as the first information. Depending on the context, the word "if" as used herein can be interpreted as "in case of" or "when" or "in response to determining."

Figure 1:
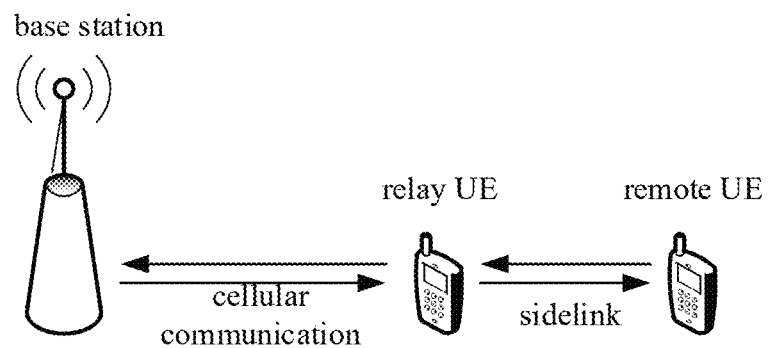
FIG. 1 shows a schematic diagram of a relay wireless communication system provided by an embodiment of the present disclosure.
Figure 2:
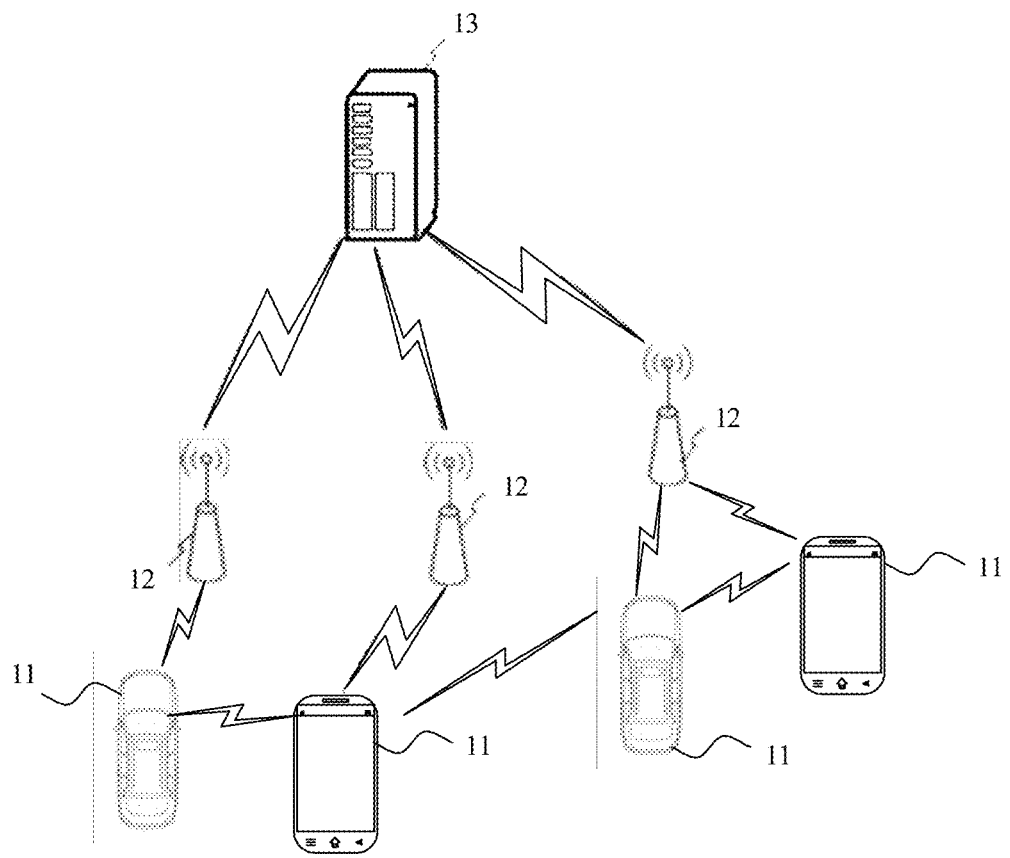
FIG. 2 shows a schematic diagram of a wireless communication system provided by an embodiment of the present disclosure.

Please refer to FIG. 2, which shows a schematic diagram of a wireless communication system provided by an embodiment of the present disclosure. As shown in FIG. 2, the wireless communication system is a communication system based on cellular mobile communication technology, and the wireless communication system may include: several terminals 11 and several base stations 12.

The terminal 11 may be a device that provides voice and/or data connectivity to the user. The terminal 11 may communicate with one or more core networks via a Radio Access Network (RAN), and the terminal 11 may be an IoT terminal such as a sensor device, a mobile phone (or "cellular" phone) and a computer of the IoT terminal, for example, may be a fixed, portable, pocket, hand-held, computer built-in or a vehicle-mounted device, for example, Station (STA), subscriber unit, subscriber station, mobile station, mobile, remote station, access point, remote terminal, access terminal, user terminal, user agent, user device, or user equipment (UE). Alternatively, the terminal 11 may also be a device of an unmanned aerial vehicle. Alternatively, the terminal 11 may also be a vehicle-mounted device, for example, a trip computer with a wireless communication function, or a wireless communication device externally connected to the trip computer. Alternatively, the terminal 11 may also be a roadside device, for example, a street light, a signal light, or other roadside devices with a wireless communication function.

The base station 12 may be a network-side device in the wireless communication system. The wireless communication system may be the 4th generation mobile communication (4G) system, also known as Long Term Evolution (LTE) system; or, the wireless communication system may also be a 5G system, also known as new radio (NR) system or 5G NR system. Alternatively, the wireless communication system may also be a next-generation system of the 5G system. The access network in the 5G system may be called NG-RAN (New Generation-Radio Access Network). Alternatively, the wireless communication system is the MTC system.

The base station 12 may be an evolved base station (eNB) used in the 4G system. Alternatively, the base station 12 may also be a base station (gNB) that adopts a centralized-distributed architecture in the 5G system. When the base station 12 adopts the centralized-distributed architecture, it usually includes a central unit (CU) and at least two distributed units (DUs). The central unit is provided with protocol stacks of a Packet Data Convergence Protocol (PDCP) layer, a Radio Link Control (RLC) layer, and a Media Access Control (MAC) layer; a physical (PHY) layer protocol stack is provided in the distributed unit, and the specific implementation of the base station 12 is not limited in embodiments of the present disclosure.

A wireless connection can be established between the base station 12 and the terminal 11 through a radio air interface. In different embodiments, the radio air interface is a radio air interface based on the fourth generation mobile communication network technology (4G) standard; or, the radio air interface is a radio air interface based on the fifth generation mobile communication network technology (5G) standard, such as a new air interface; or, the radio air interface may also be a radio air interface based on a next-generation mobile communication network technology standard of 5G.

In some embodiments, an E2E (End to End) connection may also be established between the terminals 11, for example, in scenarios such as V2V (vehicle to vehicle) communication, V2I (vehicle to Infrastructure) communication and V2P (vehicle to pedestrian) communication in V2X (vehicle to everything) communication.

In some embodiments, the above wireless communication system may further include a network management device 13.

Several base stations 12 are respectively connected to the network management device 13. The network management device 13 may be a core network device in the wireless communication system. For example, the network management device 13 may be a mobility management entity (MME) in an evolved packet core (EPC) network. Alternatively, the network management device may also be other core network devices, such as a serving gateway (SGW), a public data network gateway (PGW), a policy and charging rules function (PCRF) or home subscriber server (HSS), etc. The implementation form of the network management device 13 is not limited in embodiments of the present disclosure.

The executive subjects involved in embodiments of the present disclosure include, but are not limited to, user equipment (UE) such as terminals that support sidelink communication, and base stations for cellular mobile communication.

The application scenario of embodiments of the present disclosure is that when a remote UE has not left the coverage of the wireless network of the base station, the remote UE can report sidelink radio signal measurement results with one or more relay UEs to the base station, the base station selects the relay UE based on the sidelink radio signal measurement results, and then sends the identifier of the relay UE to the remote UE. When the UE performs measurement reporting, it only carries the sidelink radio signal measurement results and the sidelink UE identifiers. The base station does not know which network the target sidelink UE is connected to, and thus when selecting the relay UE, may select the relay UE connected to other networks, resulting in failure to complete relay communication or data loss.

Figure 3:
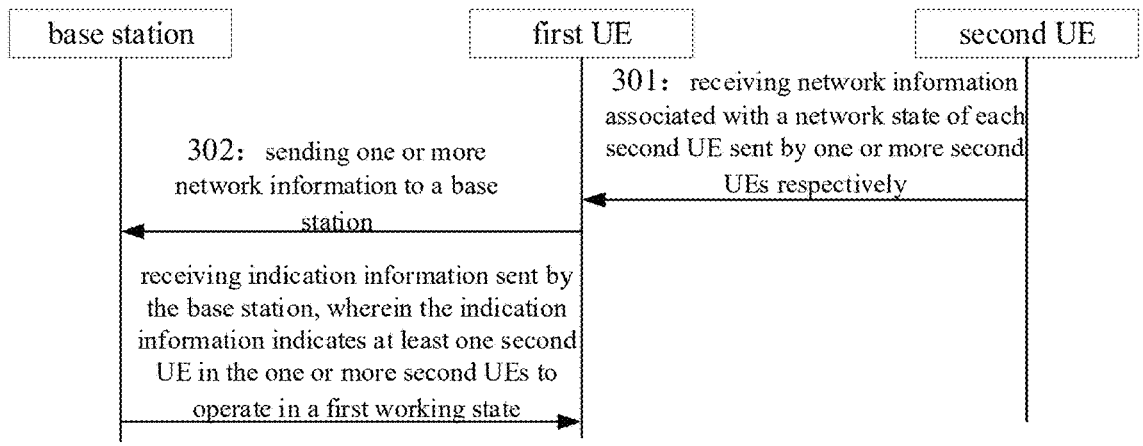
FIG. 3 is a flowchart of an information transmission method according to an embodiment.

As shown in FIG. 3, this embodiment provides an information transmission method. In a first UE of a wireless communication system, the information transmission method may include:

Step 301, receiving network information associated with a network state of each second UE sent by one or more second UEs respectively;

Step 302, sending one or more network information to the base station;

Step 303: receiving indication information sent by the base station, wherein the indication information is configured to instruct at least one second UE in the one or more second UEs to operate in a first working state.

In step 301, the first UE may be a remote UE in the relay communication based on sidelink, and the second UE may be an alternate relay UE in the sidelink relay communication. The one or more second UEs may be selected by the first UE from a plurality of UEs. The first UE may select the second UE from UEs capable of establishing the sidelink with the first UE. The second UE to which the network information belongs may also be indicated by the base station, and the base station may send a downlink instruction to the first UE to indicate the second UE to which the network information belongs.

For example, the first UE may determine, based on the broadcast information received on the sidelink, a UE that can perform sidelink connection, and determine the UE that can perform the sidelink connection as the alternate relay UE, that is, the second UE.

The network information may be used to indicate the network state of the second UE, such as an online state or an offline state, and the network information may include: identification information of the base station to which the second UE belongs, information of a cell where the second UE is located, and/or a public land mobile network (PLMN) identity, etc.

The network information may also indicate a network connection state of the second UE, for example, the second UE is in an idle state or a non-connected state. After receiving the network information, the base station or the first UE may instruct the second UE to change the current network connection state by sending an instruction or the like according to the network connection state of the second UE. For example, when the base station determines from the network information that the second UE is in the non-connected state, it can send a paging instruction to wake up the second UE.

The network information may also indicate whether the network of the second UE can meet the requirement that the second UE operates in the first working state, and the like. For example, the network information may indicate that the current working state of the second UE does not meet the requirements of the first working state, and after receiving the network information, the base station may not instruct the second UE to operate in the first working state.

The indication information sent to the second UE may be sent by the base station to the first UE, and forwarded by the first UE to the second UE; the indication information may also be directly sent by the base station to the second UE to instruct the at least one second UE to operate in the first working state.

The first working state may include a relay working state and the like. In the relay working state, the second UE may act as a relay UE to relay communication between the base station and the first UE.

The second UE may send the network information to the first UE by means of broadcasting or the like. After receiving the network information of one or more second UEs, the first UE may send the network information to the base station. Here, the first UE may carry the network information in the RRC information and send it to the base station. The RRC information may include: SidelinkUEinformation, UEAssistanceInformation or measurementreport message, etc.

After receiving the network information of one or more second UEs, the base station may select at least one second UE to operate in the first working state. For example, the base station may determine the base station connected to the second UE based on the identification information in the network information, and select the second UE to operate in the first working state when the base station connected to the second UE is the same as the base station connected to the first UE, so that the second UE can perform relay communication under the same base station, which can reduce the complicated communication caused by relaying under different communication networks.

For example, the base station may determine the cell to which the second UE belongs based on the cell information of the cell to which the second UE belongs in the network information, and when the cell to which the second UE belongs is within the coverage of the base station, the base station can use the second UE as a relay with the first UE. In this way, the second UE that has the relay condition is selected to perform the relay, so as to improve the communication quality.

Taking the first working state as the relay working state as an example, the first UE receives the network information of one or more second UEs through broadcast information of one or more second UEs, and sends the network information to the base station, and the base station determines the UE working as the relay, and indicates the second UE selected as the relay through the indication information. After receiving the indication information, the first UE may send the indication information to the selected second UE to instruct the selected second UE to perform communication relay. In an optional embodiment, the indication information may be information associated with the identity of the selected second UE, e.g., the identifier of the selected second UE, or the like. In another optional embodiment, the indication information may be directly sent by the base station to the selected second UE, and the indication information may be trigger indication for triggering the selected second UE to enter the relay state.

In this way, the base station can select the second UE operating in the first working state based on the network information, ensuring that the network state of the selected second UE can meet the requirements of the first working state, thereby improving the communication quality.

In one embodiment, the network information is used by the base station to select the at least one second UE from the one or more second UEs.

The network information may be used by the base station to determine the second UE for relaying. The base station may select a second UE that can establish communication with itself as the relay, so as to reduce the situation that the base station and the relay cannot communicate. The first UE may receive indication information sent by the base station, indicating at least one second UE in the one or more second UEs determined by the base station based on the network information to operate in the first working state.

For example, the network information may be used to characterize cells where the one or more second UEs are located. The base station may select the second UE in the same cell as the first UE as the relay UE. In this way, using the UE in the same cell as the relay of the first UE can reduce the complexity of communication and improve communication efficiency.

In this way, based on the network information, the base station can select the second UE to operate in the first working state based on the network information, ensuring that the network state of the selected second UE can meet the requirements of the first working state, thereby improving the communication quality.

In an embodiment, the information transmission method may include:
  sending the sidelink radio signal measurement results of the one or more second UEs to the base station,
  wherein, the network information and the sidelink radio signal measurement results are used by the base station to select the at least one second UE from the one or more second UEs.

Here, the first UE and the second UE may communicate through the sidelink, and when reporting one or more second UEs, that is, alternative relay UEs, the first UE may report the sidelink radio signal measurement results measured by the first UE on the sidelinks with the second UEs. The sidelink radio signal measurement result may include Reference Signal Receiving Power (RSRP) and/or Reference Signal Receiving Quality (RSRQ) of the radio signal.

After receiving the sidelink radio signal measurement results of each second UE, that is, each candidate relay UE, the base station can select a UE suitable for relaying based on a predetermined selection rule in combination with the network information. For example, a second UE whose RSRP and/or RSRQ is greater than or equal to a preset threshold and belongs to the same mobile communication network as the first UE may be selected as the relay UE; or the UE whose RSRP and/or RSRQ is greater than or equal to a preset threshold and belongs to the same cell as the first UE may also be selected as the relay UE.

In this way, selecting the second UE suitable for working in the first working state, such as a relay working state, through two dimensions of communication signal quality and network compliance represented by the network information can improve the ability of the selected second UE to conform to the requirements of the first working state, thereby improving communication quality and reducing relay data transmission errors.

In one embodiment, step 301 may include:
receiving the network information broadcast by the one or more second UEs through the sidelink;
receiving the network information unicast by the one or more second UEs through the sidelink.

Here, the second UE may broadcast its own network information, such as the cell where it resides or the PLMM identity, through the sidelink. The first UE may obtain the network information of the second UE without establishing a sidelink with the second UE.

The second UE may also unicast the network information to the first UE on the sidelink established by the first UE and the second UE by means of sending an instruction by the first UE to the second UE or the like.

In this way, the flexibility of network information transmission can be improved.

In one embodiment, the information transmission method may include:
receiving RRC reconfiguration information carrying identification information, wherein the identification information is configured to identify the one or more second UEs;
step 302 may include: sending the network information of the one or more second UEs identified by the identification information to the base station.

Here, one or more second UEs may be indicated by the base station through the identification information carried in the RRC reconfiguration information. After receiving the identification information, the first UE may send the network information of one or more second UEs indicated by the identification information to the base station.

If the base station cannot determine the network state of the candidate relay UE reported by the first UE, the base station may carry the identification information of the second UE serving as the candidate relay UE through the RRC reconfiguration information, to instruct the first UE to report the network states of the candidate relay UEs. The first UE receives the network information broadcast in the sidelink by the second UE indicated by the identification information, and sends the received network information to the base station. Here, the identification information may be a unique identification of the second UE in the network, such as an identity of the second UE in the sidelink of the first UE, and the like.

In this way, the base station can instruct the first UE to send the network information of the second UE whose network state cannot be determined by the base station through the downlink RRC reconfiguration information, and select the second UE to operate in the first working state based on the network information. This ensures that the network state of the second UE can meet the requirements of the first working state, and data transmission errors caused by the second UE not meeting the requirements of the first working state are reduced. The RRC reconfiguration information is used to carry the identification information to realize the multiplexing of the RRC reconfiguration information.

In one embodiment, the identification information includes a sidelink identifier, wherein the sidelink identifier includes: a sidelink layer 1 identifier and/or a sidelink layer 2 identifier.

In the sidelink communication between the first UE and the second UE, the sidelink identifier may uniquely characterize one second UE. When the first UE reports the alternative relay UEs, the reporting may be performed in the form of reporting the sidelink identifiers. When the base station cannot determine the network state of any second UE, the base station may instruct the first UE to obtain the network information of the corresponding second UE through the identification information. In this way, the pertinence of obtaining the network information can be improved, and the efficiency of obtaining the network information can be improved.

In one embodiment, the information transmission method may include: sending the RRC reconfiguration information carrying a network information sending instruction to the one or more second UEs, wherein the network information sending instruction is configured to instruct the one or more second UEs to send the network information;
step 301 may include: receiving the network information respectively sent by the one or more second UEs in response to the network information sending instruction.

Here, the RRC reconfiguration information received from the base station may further include the network information sending instruction. After receiving the network information sending instruction, the first UE may forward the RRC reconfiguration information to the second UE, which is configured to instruct the second UE to send its own network information through the sidelink. After receiving the RRC reconfiguration information, the second UE may unicast the network information to the first UE through the sidelink. After receiving the unicast network information, the first UE forwards the network information to the base station. The RRC reconfiguration information may be a sidelinkRRCReconfigure message.

Here, after receiving the RRC reconfiguration information, the first UE may send the network information sending instruction to the second UE indicated by the identification information in combination with the identification information and the network information sending instruction. In this way, the network information sending instruction is sent only to the second UE whose network information has not be obtained, so as to obtain the network information. For the second UE whose network information has been obtained, the network information sending instruction is not sent, thereby saving network transmission resources.

In this way, the network information sending instruction is sent only to the second UE whose network information has not been obtained, to obtain the network information; for different second UEs, different ways are used to obtain the network information, improving the diversity of the ways of obtaining the network information.

In an embodiment, the network information includes one of the following:

PLMN identities of the one or more second UEs in a connected state, and/or cell identities of cells to which the one or more second UEs in the connected state are connected, and/or radio signal measurement results of the one or more second UEs in the connected state for connected cells;

PLMN identities of the one or more second UEs in an idle state, and/or cell identities of cells where the one or more second UEs in the idle state reside, and/or radio signal measurement results of the one or more second UEs in the idle state for the cells where they reside;

PLMN identities of the one or more second UEs in an inactive state, and/or cell identities of cells where the one or more second UEs in the inactive state reside, and/or radio signal measurement results of the one or more second UEs in the inactive state for the cells where they reside.

Here, the PLMN identities can distinguish different mobile communication networks, and the base station can select at least one second UE from the one or more second UEs to operate in the first working state based on the mobile communication network to which it belongs. For example, the base station may select the second UE corresponding to the PLMN identity belonging to the same mobile communication network as the relay UE for relaying the communication between the first UE and the base station.

For one or more second UEs in the connected state, the network information may be the identity of the cell to which the second UE is connected, and the base station may determine whether the second UE is within the coverage of the base station according to the identity of the cell to which the second UE is connected. When the second UE is within the coverage of the base station, the second UE may be selected to operate in the first working state.

For one or more second UEs in the idle state or inactive state, the network information may be the identity of the cell where the second UE resides, and the base station may determine whether the second UE is within the coverage of the base station according to the identity of the cell where the second UE resides. When the second UE is within the coverage of the base station, the second UE may be selected to operate in the first working state.

The second UE may also send the radio signal measurement result of the connected cell or the cell where it resides measured by itself to the base station, and the base station may determine whether the signal state of the second UE can meet the requirements of the first working state according to the radio signal measurement result. When the radio signal measurement result meets the requirements of the first working state, the second UE may be selected to operate in the first working state. For example, the base station may determine, according to the network information, the cell where the second UE resides and the radio signal measurement result of the cell where the second UE resides measured by the second UE. When the cell where the second UE resides is within the coverage of the base station, and the radio signal measurement result is greater than or equal to a predicted signal measurement result threshold, it can be determined that the second UE meets the conditions for serving as a relay, and the base station can select the second UE as the relay UE. The base station may send indication information instructing the second UE to operate in the first working state to the first UE.

In this way, the base station determines whether the second UE can operate in the first working state based on the mobile communication network where the second UE is located, the cell where the second UE is located, and the radio signal measurement result, etc, which reduces communication failure caused since the second UE does not satisfy the requirements of the first working state, and improves communication efficiency.

In one embodiment, the first working state includes: a relay working state and/or a sidelink discontinuous reception working state; the information transmission method may include at least one of the following:

maintaining communication with the base station through the at least one second UE in the relay working state;

performing discontinuous reception with the at least one second UE in the sidelink discontinuous reception working state through a sidelink.

In the relay working state, the second UE relays the communication between the first UE and the base station, and the first UE can maintain communication with the base station outside the coverage of the base station, or maintain communication with the base station without accessing the base station.

Here, the sidelink discontinuous reception working state may be that when the first UE and/or the second UE are connected through the sidelink, the discontinuous reception working mode may be used to communicate. In the discontinuous reception working state, the first UE and/or the second UE may enter the sleep period, and only keep monitoring the sidelink broadcast channel for a predetermined period. In this way, on the one hand, their own power can be saved, and on the other hand, channel resources can be released during the sleep period, and can be used by other UEs, to improve resource utilization efficiency.

Figure 4:
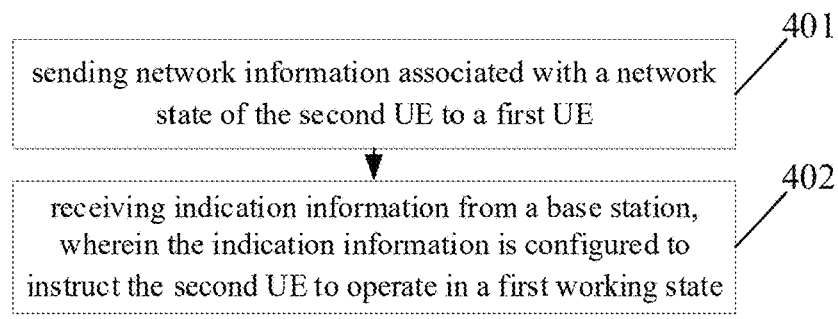
FIG. 4 is a flowchart of another information transmission method according to an embodiment.

As shown in FIG. 4, this embodiment provides an information transmission method. In a second UE of the wireless communication system, the information transmission method may include:

step 401, sending network information associated with a network state of the second UE to a first UE; and step 402, receiving indication information from the base station, in which the indication information is configured to instruct the second UE to operate in a first working state.

The first UE may be a remote UE in the relay communication based on sidelink, and the second UE may be an alternate relay UE in the sidelink relay communication. The one or more second UEs may be selected by the first UE from a plurality of UEs. The first UE may select the second UE from UEs capable of establishing the sidelink with the first UE. The second UE to which the network information belongs may also be indicated by the base station, and the base station may send a downlink instruction to the first UE to indicate the second UE to which the network information belongs.

For example, the first UE may determine, based on the broadcast information received on the sidelink, a UE that can perform sidelink connection, and determine the UE that can perform the sidelink connection as the alternate relay UE, that is, the second UE.

The network information may be used to indicate the network state of the second UE, such as an online state or an offline state, and the network information may include: identification information of the base station to which the second UE belongs, information of a cell where the second UE is located, and/or a public land mobile network (PLMN) identity, etc.

The network information may also indicate a network connection state of the second UE, for example, the second UE is in an idle state or a non-connected state. After receiving the network information, the base station or the first UE may instruct the second UE to change the current network connection state by sending an instruction or the like according to the network connection state of the second UE. For example, when the base station determines from the network information that the second UE is in the non-connected state, it can send a paging instruction to wake up the second UE.

The network information may also indicate whether the network of the second UE can meet the requirement that the second UE operates in the first working state, and the like. For example, the network information may indicate that the current working state of the second UE does not meet the requirements of the first working state, and after receiving the network information, the base station may not instruct the second UE to operate in the first working state.

The indication information sent to the second UE may be sent by the base station to the first UE, and forwarded by the first UE to the second UE; the indication information may also be directly sent by the base station to the second UE to instruct the at least one second UE to operate in the first working state.

The first working state may include a relay working state and the like. In the relay working state, the second UE may act as a relay UE to relay communication between the base station and the first UE.

The second UE may send the network information to the first UE by means of broadcasting or the like. After receiving the network information of one or more second UEs, the first UE may send the network information to the base station. Here, the first UE may carry the network information in the RRC information and send it to the base station. The RRC information may include: SidelinkUEinformation, UEAssistanceInformation or measurementreport message, etc.

After receiving the network information of one or more second UEs, the base station may select at least one second UE to operate in the first working state. For example, the base station may determine the base station connected to the second UE based on the identification information in the network information, and select the second UE to operate in the first working state when the base station connected to the second UE is the same as the base station connected to the first UE, so that the second UE can perform relay communication under the same base station, which can reduce the complicated communication caused by relaying under different communication networks.

For example, the base station may determine the cell to which the second UE belongs based on the cell information of the cell to which the second UE belongs in the network information, and when the cell to which the second UE belongs is within the coverage of the base station, the base station can use the second UE as a relay with the first UE. In this way, the second UE that has the relay condition is selected to perform the relay, so as to improve the communication quality.

Taking the first working state as the relay working state as an example, the first UE receives the network information of one or more second UEs through broadcast information of one or more second UEs, and sends the network information to the base station, and the base station determines the UE working as the relay, and indicates the second UE selected as the relay through the indication information. After receiving the indication information, the first UE may send the indication information to the selected second UE to instruct the selected second UE to perform communication relay. In an optional embodiment, the indication information may be information associated with the identity of the selected second UE, e.g., the identifier of the selected second UE, or the like. In another optional embodiment, the indication information may be directly sent by the base station to the selected second UE, and the indication information may be trigger indication for triggering the selected second UE to enter the relay state.

In this way, the base station can select the second UE operating in the first working state based on the network information, ensuring that the network state of the selected second UE can meet the requirements of the first working state, thereby improving the communication quality.

In one embodiment, the network information is used by the base station to select the at least one second UE from the one or more second UEs.

The network information may be used by the base station to determine the second UE for relaying. The base station may select a second UE that can establish communication with itself as the relay, so as to reduce the situation that the base station and the relay cannot communicate. The first UE may receive indication information sent by the base station, indicating at least one second UE in the one or more second UEs determined by the base station based on the network information to operate in the first working state.

For example, the network information may be used to characterize cells where the one or more second UEs are located. The base station may select the second UE in the same cell as the first UE as the relay UE. In this way, using the UE in the same cell as the relay of the first UE can reduce the complexity of communication and improve communication efficiency.

In this way, based on the network information, the base station can select the second UE to operate in the first working state based on the network information, ensuring that the network state of the selected second UE can meet the requirements of the first working state, thereby improving the communication quality.

In an embodiment, step 401 includes:
broadcasting the network information to the first UE through a sidelink;
unicasting the network information to the first UE through a sidelink.

Here, the second UE may broadcast its own network information, such as the cell where it resides or the PLMM identity, through the sidelink. The first UE may obtain the network information of the second UE without establishing a sidelink with the second UE.

The second UE may also unicast the network information to the first UE on the sidelink established by the first UE and the second UE by means of sending an instruction by the first UE to the second UE or the like.

In this way, the flexibility of network information transmission can be improved.

In one embodiment, the information transmission method may include: receiving RRC reconfiguration information carrying a network information sending instruction, wherein the network information sending instruction is configured to instruct the second UE to send the network information;

step 401 may include: sending the network information associated with the network state of the second UE to the first UE according to the network information sending instruction.

Here, one or more second UEs may be indicated by the base station through the identification information carried in the RRC reconfiguration information. After receiving the identification information, the first UE may send the network information of one or more second UEs indicated by the identification information to the base station.

If the base station cannot determine the network state of the candidate relay UE reported by the first UE, the base station may carry the identification information of the second UE serving as the candidate relay UE through the RRC reconfiguration information, to instruct the first UE to report the network states of the candidate relay UEs. The first UE receives the network information broadcast in the sidelink by the second UE indicated by the identification information, and sends the received network information to the base station. Here, the identification information may be a unique identification of the second UE in the network, such as an identity of the second UE in the sidelink of the first UE, and the like.

In this way, the base station can instruct the first UE to send the network information of the second UE whose network state cannot be determined by the base station through the downlink RRC reconfiguration information, and select the second UE to operate in the first working state based on the network information. This ensures that the network state of the second UE can meet the requirements of the first working state, and data transmission errors caused by the second UE not meeting the requirements of the first working state are reduced. The RRC reconfiguration information is used to carry the identification information to realize the multiplexing of the RRC reconfiguration information.

In an embodiment, step 401 may include one of the following:
  in response to the second UE being in a connected state, sending a PLMN identity, and/or a cell identity of a cell to which the second UE is connected, and/or a radio signal measurement result of the second UE for the connected cell to the first UE;
  in response to the second UE being in an idle state, sending a PLMN identity, and/or a cell identity of a cell where the second UE resides, and/or a radio signal measurement result of the second UE for the cell where it resides;
  in response to the second UE being in an inactive state, sending a PLMN identity, and/or a cell identity of a cell where the second UE resides, and/or a radio signal measurement result of the second UE for the cell where it resides.

Here, the PLMN identities can distinguish different mobile communication networks, and the base station can select at least one second UE from the one or more second UEs to operate in the first working state based on the mobile communication network to which it belongs. For example, the base station may select the second UE corresponding to the PLMN identity belonging to the same mobile communication network as the relay UE for relaying the communication between the first UE and the base station.

For one or more second UEs in the connected state, the network information may be the identity of the cell to which the second UE is connected, and the base station may determine whether the second UE is within the coverage of the base station according to the identity of the cell to which the second UE is connected. When the second UE is within the coverage of the base station, the second UE may be selected to operate in the first working state.

For one or more second UEs in the idle state or inactive state, the network information may be the identity of the cell where the second UE resides, and the base station may determine whether the second UE is within the coverage of the base station according to the identity of the cell where the second UE resides. When the second UE is within the coverage of the base station, the second UE may be selected to operate in the first working state.

The second UE may also send the radio signal measurement result of the connected cell or the cell where it resides measured by itself to the base station, and the base station may determine whether the signal state of the second UE can meet the requirements of the first working state according to the radio signal measurement result. When the radio signal measurement result meets the requirements of the first working state, the second UE may be selected to operate in the first working state. For example, the base station may determine, according to the network information, the cell where the second UE resides and the radio signal measurement result of the cell where the second UE resides measured by the second UE. When the cell where the second UE resides is within the coverage of the base station, and the radio signal measurement result is greater than or equal to a predicted signal measurement result threshold, it can be determined that the second UE meets the conditions for serving as a relay, and the base station can select the second UE as the relay UE. The base station may send indication information instructing the second UE to operate in the first working state to the first UE.

In this way, the base station determines whether the second UE can operate in the first working state based on the mobile communication network where the second UE is located, the cell where the second UE is located, and the radio signal measurement result, etc, which reduces communication failure caused since the second UE does not satisfy the requirements of the first working state, and improves communication efficiency.

In one embodiment, the first working state includes: a relay working state and/or a sidelink discontinuous reception working state;
  the information transmission method may include at least one of the following:
  maintaining communication between the first UE and the base station;
  performing discontinuous reception with the second UE.

In the relay working state, the second UE relays the communication between the first UE and the base station, and the first UE can maintain communication with the base station outside the coverage of the base station, or maintain communication with the base station without accessing the base station.

Here, the sidelink discontinuous reception working state may be that when the first UE and/or the second UE are connected through the sidelink, the discontinuous reception working mode may be used to communicate. In the discontinuous reception working state, the first UE and/or the second UE may enter the sleep period, and only keep monitoring the sidelink broadcast channel for a predetermined period. In this way, on the one hand, their own power can be saved, and on the other hand, channel resources can be released during the sleep period, and can be used by other UEs, to improve resource utilization efficiency.

In one embodiment, the network information is sent via the first UE to the base station for the base station to select the second UE from one or more UEs.

Here, the second UE may broadcast its own network information, such as the cell where it resides or the PLMM identity, through the sidelink. The first UE may obtain the network information of the second UE without establishing a sidelink with the second UE.

The second UE may also unicast the network information to the first UE on the sidelink established by the first UE and the second UE by means of sending an instruction by the first UE to the second UE or the like.

In this way, the flexibility of network information transmission can be improved.

Figure 5:
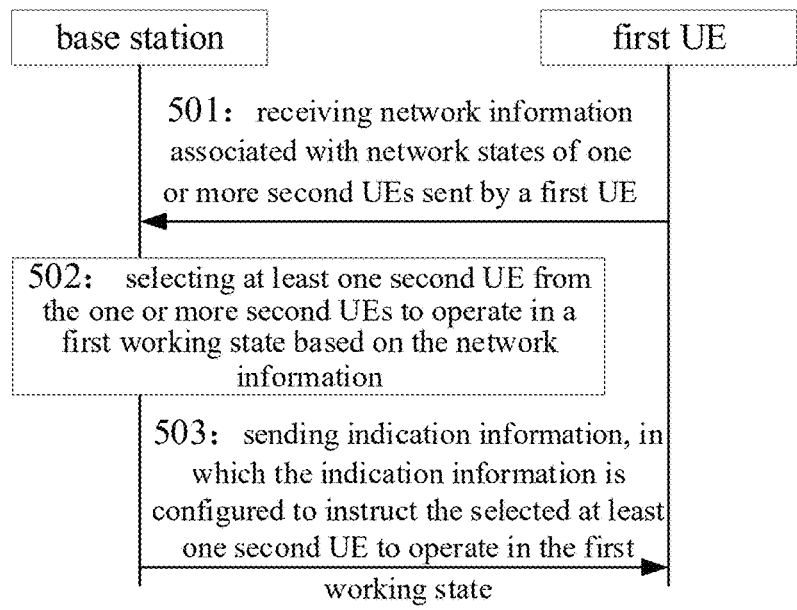
FIG. 5 is a flowchart of yet another information transmission method according to an embodiment.

As shown in FIG. 5, this embodiment provides an information transmission method. In a base station of a wireless communication system, the information transmission method may include:

step 501, receiving network information associated with network states of one or more second UEs sent by a first UE;

step 502, selecting at least one second UE from the one or more second UEs to operate in a first working state based on the network information;

step 503, sending indication information, in which the indication information is configured to instruct the selected at least one second UE to operate in the first working state.

Although in FIG. 5, the indication information is sent to the first UE, it should be understood that the indication information may also be directly sent to the second UE, to instruct the at least one second UE to operate in the first working state.

The first UE may be a remote UE in the relay communication based on sidelink, and the second UE may be an alternate relay UE in the sidelink relay communication. The one or more second UEs may be selected by the first UE from a plurality of UEs. The first UE may select the second UE from UEs capable of establishing the sidelink with the first UE. The second UE to which the network information belongs may also be indicated by the base station, and the base station may send a downlink instruction to the first UE to indicate the second UE to which the network information belongs.

For example, the first UE may determine, based on the broadcast information received on the sidelink, a UE that can perform sidelink connection, and determine the UE that can perform the sidelink connection as the alternate relay UE, that is, the second UE.

The network information may be used to indicate the network state of the second UE, such as an online state or an offline state, and the network information may include: identification information of the base station to which the second UE belongs, information of a cell where the second UE is located, and/or a public land mobile network (PLMN) identity, etc.

The network information may also indicate a network connection state of the second UE, for example, the second UE is in an idle state or a non-connected state. After receiving the network information, the base station or the first UE may instruct the second UE to change the current network connection state by sending an instruction or the like according to the network connection state of the second UE. For example, when the base station determines from the network information that the second UE is in the non-connected state, it can send a paging instruction to wake up the second UE.

The network information may also indicate whether the network of the second UE can meet the requirement that the second UE operates in the first working state, and the like. For example, the network information may indicate that the current working state of the second UE does not meet the requirements of the first working state, and after receiving the network information, the base station may not instruct the second UE to operate in the first working state.

The first working state may include a relay working state and the like. In the relay working state, the second UE may act as a relay UE to relay communication between the base station and the first UE.

The second UE may send the network information to the first UE by means of broadcasting or the like. After receiving the network information of one or more second UEs, the first UE may send the network information to the base station. Here, the first UE may carry the network information in the RRC information and send it to the base station. The RRC may information include: Sidelink UEinformation, UEAssistanceInformation or measurementreport message, etc.

After receiving the network information of one or more second UEs, the base station may select at least one second UE to operate in the first working state. For example, the base station may determine the base station connected to the second UE based on the identification information in the network information, and select the second UE to operate in the first working state when the base station connected to the second UE is the same as the base station connected to the first UE, so that the second UE can perform relay communication under the same base station, which can reduce the complicated communication caused by relaying under different communication networks.

For example, the base station may determine the cell to which the second UE belongs based on the cell information of the cell to which the second UE belongs in the network information, and when the cell to which the second UE belongs is within the coverage of the base station, the base station can use the second UE as a relay with the first UE. In this way, the second UE that has the relay condition is selected to perform the relay, so as to improve the communication quality.

Taking the first working state as the relay working state as an example, the first UE receives the network information of one or more second UEs through broadcast information of one or more second UEs, and sends the network information to the base station, and the base station determines the UE working as the relay, and indicates the second UE selected as the relay through the indication information. After receiving the indication information, the first UE may send the indication information to the selected second UE to instruct the selected second UE to perform communication relay. In an optional embodiment, the indication information may be information associated with the identity of the selected second UE, e.g., the identifier of the selected second UE, or the like. In another optional embodiment, the indication information may be directly sent by the base station to the selected second UE, and the indication information may be trigger indication for triggering the selected second UE to enter the relay state.

In this way, the base station can select the second UE operating in the first working state based on the network information, ensuring that the network state of the selected second UE can meet the requirements of the first working state, thereby improving the communication quality.

The network information may be used by the base station to determine the second UE for relaying. The base station may select a second UE that can establish communication with itself as the relay, so as to reduce the situation that the base station and the relay cannot communicate. The first UE may receive indication information sent by the base station, indicating at least one second UE in the one or more second UEs determined by the base station based on the network information to operate in the first working state.

For example, the network information may be used to characterize cells where the one or more second UEs are located. The base station may select the second UE in the same cell as the first UE as the relay UE. In this way, using the UE in the same cell as the relay of the first UE can reduce the complexity of communication and improve communication efficiency.

In this way, based on the network information, the base station can select the second UE to operate in the first working state based on the network information, ensuring that the network state of the selected second UE can meet the requirements of the first working state, thereby improving the communication quality.

In an embodiment, the information transmission method may include:
  receiving sidelink radio signal measurement results of the one or more second UEs sent by the first UE;
  selecting at least one second UE from the one or more second UEs to operate in the first working state based on the network information includes:
  selecting the at least one second UE from the one or more second UEs to operate in the first working state based on the network information and the sidelink radio signal measurement results.

Here, the first UE and the second UE may communicate through the sidelink, and when reporting one or more second UEs, that is, alternative relay UEs, the first UE may report the sidelink radio signal measurement results measured by the first UE on the sidelinks with the second UEs. The sidelink radio signal measurement result may include Reference Signal Receiving Power (RSRP) and/or Reference Signal Receiving Quality (RSRQ) of the radio signal.

After receiving the sidelink radio signal measurement results of each second UE, that is, each candidate relay UE, the base station can select a UE suitable for relaying based on a predetermined selection rule in combination with the network information. For example, a second UE whose RSRP and/or RSRQ is greater than or equal to a preset threshold and belongs to the same mobile communication network as the first UE may be selected as the relay UE; or the UE whose RSRP and/or RSRQ is greater than or equal to a preset threshold and belongs to the same cell as the first UE may also be selected as the relay UE.

In this way, selecting the second UE suitable for working in the first working state, such as a relay working state, through two dimensions of communication signal quality and network compliance represented by the network information can improve the ability of the selected second UE to conform to the requirements of the first working state, thereby improving communication quality and reducing relay data transmission errors.

In an embodiment, the information transmission method may include:
  sending RRC reconfiguration information carrying identification information, in which the identification information is configured to identify the one or more second UEs;
  receiving network information associated with network states of one or more second UEs sent by the first UE, includes:
  receiving the network information of the one or more second UEs identified by the identification information.

Here, one or more second UEs may be indicated by the base station through the identification information carried in the RRC reconfiguration information. After receiving the identification information, the first UE may send the network information of one or more second UEs indicated by the identification information to the base station.

If the base station cannot determine the network state of the candidate relay UE reported by the first UE, the base station may carry the identification information of the second UE serving as the candidate relay UE through the RRC reconfiguration information, to instruct the first UE to report the network states of the candidate relay UEs. The first UE receives the network information broadcast in the sidelink by the second UE indicated by the identification information, and sends the received network information to the base station. Here, the identification information may be a unique identification of the second UE in the network, such as an identity of the second UE in the sidelink of the first UE, and the like.

In this way, the base station can instruct the first UE to send the network information of the second UE whose network state cannot be determined by the base station through the downlink RRC reconfiguration information, and select the second UE to operate in the first working state based on the network information. This ensures that the network state of the second UE can meet the requirements of the first working state, and data transmission errors caused by the second UE not meeting the requirements of the first working state are reduced. The RRC reconfiguration information is used to carry the identification information to realize the multiplexing of the RRC reconfiguration information.

In one embodiment, the identification information includes a sidelink identifier, wherein the sidelink identifier includes: a sidelink layer 1 identifier and/or a sidelink layer 2 identifier.

In the sidelink communication between the first UE and the second UE, the sidelink identifier may uniquely characterize one second UE. When the first UE reports the alternative relay UEs, the reporting may be performed in the form of reporting the sidelink identifiers. When the base station cannot determine the network state of any second UE, the base station may instruct the first UE to obtain the network information of the corresponding second UE through the identification information. In this way, the pertinence of obtaining the network information can be improved, and the efficiency of obtaining the network information can be improved.

In an embodiment, the RRC reconfiguration information further includes a network information sending instruction, wherein the RRC reconfiguration information is forwarded by the first UE to the one or more second UEs, wherein the network information sending instruction is configured to instruct the one or more second UEs to send the network information.

Here, the RRC reconfiguration information received from the base station may further include the network information sending instruction. After receiving the network information sending instruction, the first UE may forward the RRC reconfiguration information to the second UE, which is configured to instruct the second UE to send its own network information through the sidelink. After receiving the RRC reconfiguration information, the second UE may unicast the network information to the first UE through the sidelink. After receiving the unicast network information, the first UE forwards the network information to the base station. The RRC reconfiguration information may be a sidelinkRRCReconfigure message.

Here, after receiving the RRC reconfiguration information, the first UE may send the network information sending instruction to the second UE indicated by the identification information in combination with the identification information and the network information sending instruction. In this way, the network information sending instruction is sent only to the second UE whose network information has not be obtained, so as to obtain the network information. For the second UE whose network information has been obtained, the network information sending instruction is not sent, thereby saving network transmission resources.

In this way, the network information sending instruction is sent only to the second UE whose network information has not been obtained, to obtain the network information; for different second UEs, different ways are used to obtain the network information, improving the diversity of the ways of obtaining the network information.

In an embodiment, the network information includes one of the following:
- PLMN identities of the one or more second UEs in a connected state, and/or cell identities of cells to which the one or more second UEs in the connected state are connected, and/or radio signal measurement results of the one or more second UEs in the connected state for connected cells;
- PLMN identities of the one or more second UEs in an idle state, and/or cell identities of cells where the one or more second UEs in the idle state reside, and/or radio signal measurement results of the one or more second UEs in the idle state for the cells where they reside;
- PLMN identities of the one or more second UEs in an inactive state, and/or cell identities of cells where the one or more second UEs in the inactive state reside, and/or radio signal measurement results of the one or more second UEs in the inactive state for the cells where they reside.

Here, the PLMN identities can distinguish different mobile communication networks, and the base station can select at least one second UE from the one or more second UEs to operate in the first working state based on the mobile communication network to which it belongs. For example, the base station may select the second UE corresponding to the PLMN identity belonging to the same mobile communication network as the relay UE for relaying the communication between the first UE and the base station.

For one or more second UEs in the connected state, the network information may be the identity of the cell to which the second UE is connected, and the base station may determine whether the second UE is within the coverage of the base station according to the identity of the cell to which the second UE is connected. When the second UE is within the coverage of the base station, the second UE may be selected to operate in the first working state.

For one or more second UEs in the idle state or inactive state, the network information may be the identity of the cell where the second UE resides, and the base station may determine whether the second UE is within the coverage of the base station according to the identity of the cell where the second UE resides. When the second UE is within the coverage of the base station, the second UE may be selected to operate in the first working state.

The second UE may also send the radio signal measurement result of the connected cell or the cell where it resides measured by itself to the base station, and the base station may determine whether the signal state of the second UE can meet the requirements of the first working state according to the radio signal measurement result. When the radio signal measurement result meets the requirements of the first working state, the second UE may be selected to operate in the first working state. For example, the base station may determine, according to the network information, the cell where the second UE resides and the radio signal measurement result of the cell where the second UE resides measured by the second UE. When the cell where the second UE resides is within the coverage of the base station, and the radio signal measurement result is greater than or equal to a predicted signal measurement result threshold, it can be determined that the second UE meets the conditions for serving as a relay, and the base station can select the second UE as the relay UE. The base station may send indication information instructing the second UE to operate in the first working state to the first UE.

In this way, the base station determines whether the second UE can operate in the first working state based on the mobile communication network where the second UE is located, the cell where the second UE is located, and the radio signal measurement result, etc, which reduces communication failure caused since the second UE does not satisfy the requirements of the first working state, and improves communication efficiency.

In one embodiment, the first working state includes: a relay working state and/or a sidelink discontinuous reception working state;
the information transmission method may include: maintaining communication with the first UE through the at least one second UE in the relay working state.

In the relay working state, the second UE relays the communication between the first UE and the base station, and the first UE can maintain communication with the base station outside the coverage of the base station, or maintain communication with the base station without accessing the base station.

Here, the sidelink discontinuous reception working state may be that when the first UE and/or the second UE are connected through the sidelink, the discontinuous reception working mode may be used to communicate. In the discontinuous reception working state, the first UE and/or the second UE may enter the sleep period, and only keep monitoring the sidelink broadcast channel for a predetermined period. In this way, on the one hand, their own power can be saved, and on the other hand, channel resources can be released during the sleep period, and can be used by other UEs, to improve resource utilization efficiency.

In one embodiment, the network information is received by the first UE from the one or more second UE via the sidelink.

Here, the second UE may broadcast its own network information, such as the cell where it resides or the PLMM identity, through the sidelink. The first UE may obtain the network information of the second UE without establishing a sidelink with the second UE.

The second UE may also unicast the network information to the first UE on the sidelink established by the first UE and the second UE by means of sending an instruction by the first UE to the second UE or the like.

In this way, the flexibility of network information transmission can be improved.

A specific example is provided below in conjunction with any of the above-mentioned embodiments.

On the side of the first UE, the first UE receives the network information associated with the network state of the second UE from the second UE; sends the network information to the base station; receives an indication from the base station about causing the second UE to operate in the first working state.

On the side of the second UE, the second UE sends network information associated with the network state of the second UE to the first UE; and receives the indication from the base station about causing the second UE to operate in the first working state.

On the base station side, the base station receives network information associated with network states of multiple second UEs sent by the first UE; selects at least one second UE from the multiple second UEs based on the network information; sends the indication about causing the second UE to operate in the first working state.

The base station may send an RRC reconfiguration message to the first UE, which carries identifiers of the one or more second UEs, and this identifier may be a sidelink identifier or a sidelink layer 1 identifier.

The second UE can broadcast its own network state through the sidelink, and the first UE does not need to establish a sidelink connection, and can obtain the network state of the second UE by reading the broadcast.

The first UE reads the corresponding broadcast according to the second UE identifier indicated by the base station, obtains network state information, and reports it to the base station through an RRC message, which may be SidelinkUEinformation, UEAssistanceInformation or measurementreport message.

If the network information of the second UE cannot be obtained by broadcasting, the first UE sends a sidelinkRRCReconfigure message to the second UE indicated by the base station, which carries the indication. After receiving the message, the second UE sends its own network state to the first UE.

The network information includes the state the UE is in, including a connected state, an idle state and an inactive state.

The network information includes the identity of the cell to which the UE in the connected state is connected, the PLMN identity, etc., or the identity of the cell where the UE in the idle state and the inactive state resides, the PLMN identity, etc.

Figure 6:
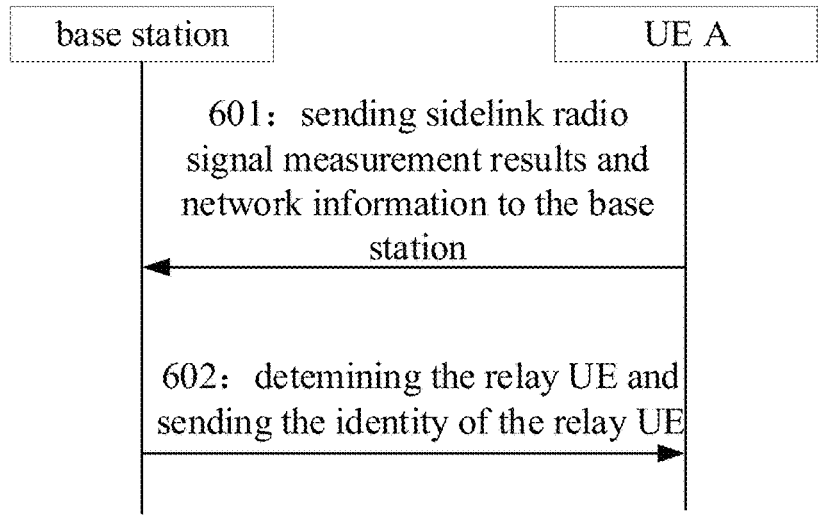
FIG. 6 is a flowchart of still another information transmission method according to an embodiment.

An information transmission method provided by this example, as shown in FIG. 6, specifically includes the following.

The remote UE is A, and the three candidate relay UEs are UE B, UE C, and UE D, respectively.
 1) the identity of the cell to which UE A is connected is 01, and the PLMN identity is 000;
 2) UE B broadcasts that it is in the connected state through the sidelink, the identity of the cell to which it is connected is 01, and the PLMN identity is 000;
 3) UE C broadcasts that it is in the connected state through the sidelink, the identity of the cell to which it is connected is 02, and the PLMN identity is 000;
 4) UE D broadcasts that it is in an idle state through the sidelink, the identity of the cell where it resides is 01, and the PLMN identity is 001.

Step 601: UE A reports to the base station that the sidelink radio signal measurement results of the three relay UEs are −97 db, −98 db, and −96 db respectively, and simultaneously reports the network information broadcast by the relay UEs.

Step 602: After receiving the information reported by UE A, the base station selects UE B as the relay UE, and sends the identity of UE B to UE A. Subsequently, UE A can perform relay communication through UE B.

Figure 7:
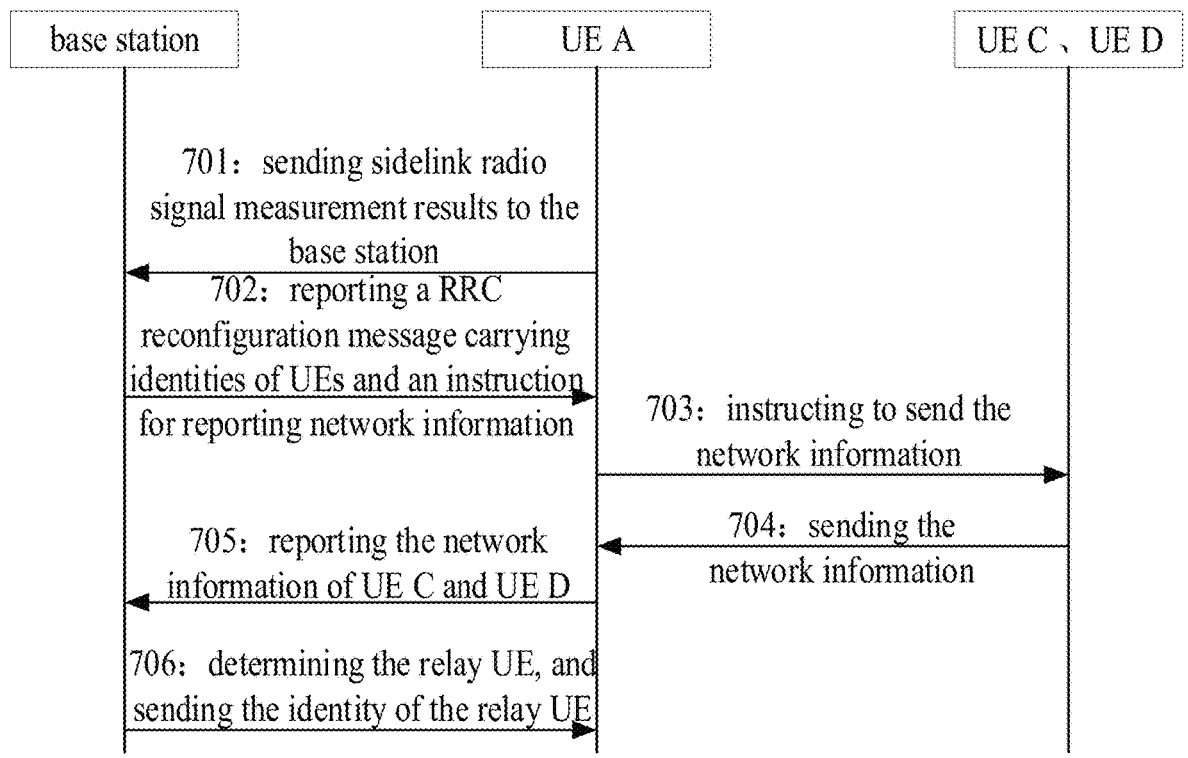
FIG. 7 is a flowchart of still yet another information transmission method according to an embodiment.

Another information transmission method provided by this example, as shown in FIG. 7, specifically includes the following.

The remote UE is A, and three candidate relay UEs are UE B, UE C, and UE D, respectively.
 1) the identity of the cell to which UE A is connected is 01, and the PLMN identity is 000;
 2) the relay UE B is in the connected state, the identity of the cell to which it is connected is 01, and the PLMN identity is 000;
 3) the relay UE C is in the connected state, the identity of the cell to which it is connected is 02, and the PLMN identity is 000;
 4) the relay UE D is in an idle state, the identity of the cell where it resides is 01, and the PLMN identity is 001.

Step 701: UE A reports to the base station that the sidelink radio signal measurement results of the three candidate relay UEs are −97 db, −98 db, and −96 db respectively.

Step 702: After receiving the report from UE A, the base station finds that UE B is in its own cell, but does not know the network information of UE C and UE D, and sends an RRC reconfiguration message to UE A, which carries the identities of UE C and UE D, and an instruction for reporting the network information.

Step 703: After receiving the RRC reconfiguration message sent by the base station, UE A sends a sidelink RRC reconfiguration message to UE C and UE D, instructing them to send the network information.

Step 704: After receiving the sidelink RRC reconfiguration message sent by UE A, UE C and UE D send the network information to UE A through the sidelink unicast message.

Step 705: UE A reports the network information of UE C and UE D to the base station.

Step 706: After receiving the message reported by UE A, the base station selects UE B as the relay UE, and sends the identity of UE B to UE A, and UE A can perform relay communication through UE B subsequently.

Figure 8:
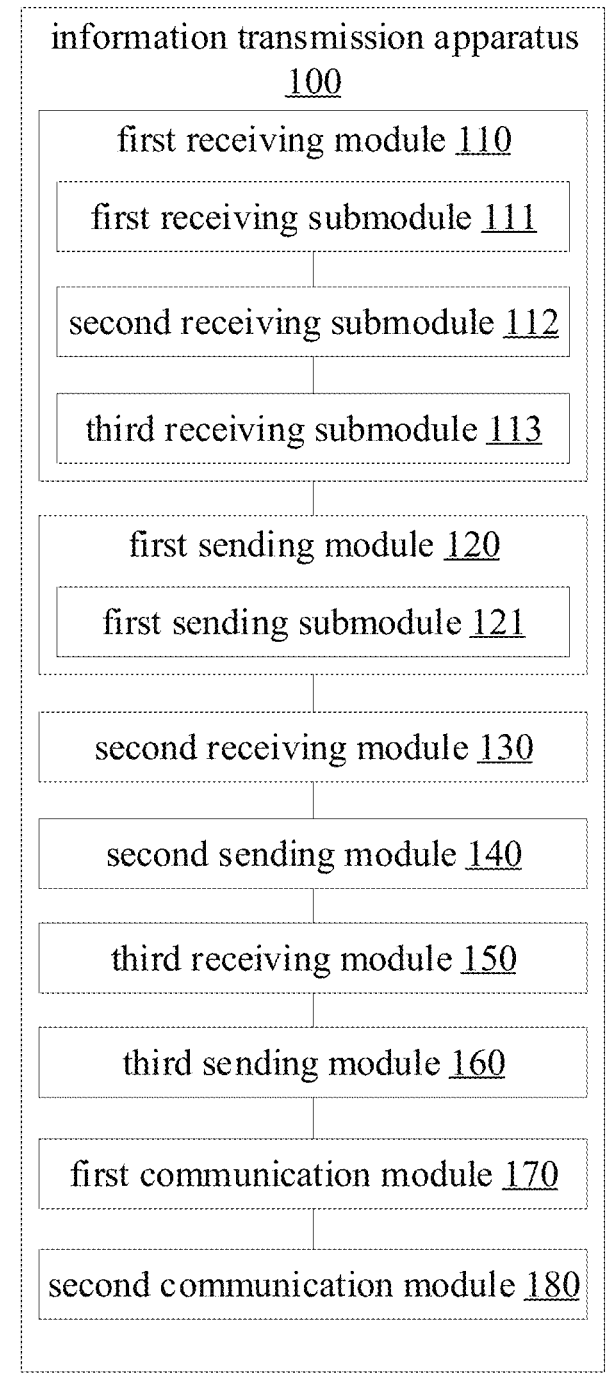
FIG. 8 is a block diagram of an information transmission apparatus according to an embodiment.

An embodiment of the present disclosure further provides an information transmission apparatus, which is applied to a first UE. FIG. 8 is a block diagram of an information transmission apparatus 100 provided by an embodiment of the present disclosure. As shown in FIG. 8, the apparatus 100 includes: a first receiving module 110, a first sending module 120 and a second receiving module 130.

The first receiving module 110 is configured to receiving network information associated with a network state of each second UE sent by one or more second UEs respectively.

The first sending module 120 is configured to send one or more network information to a base station.

The second receiving module 130 is configured to receive indication information sent by the base station, wherein the indication information is configured to instruct at least one second UE in the one or more second UE to operate in a first working state.

In an embodiment, the network information is used by the base station to select the at least one second UE from the one or more second UEs.

In an embodiment, the apparatus 100 further includes:
 a second sending module, configured to send sidelink radio signal measurement results of the one or more second UEs to the base station, wherein, the network information and the sidelink radio signal measurement results are used by the base station to select the at least one second UE from the one or more second UEs.

In an embodiment, the first receiving module 110 includes:
 a first receiving submodule 111, configured to receive the network information broadcast by the one or more second UEs through a sidelink;

a second receiving submodule 112, configured to receive the network information unicast by the one or more second UEs through a sidelink.

In an embodiment, the apparatus 100 further includes:
a third receiving module 150, configured to receive radio resource control (RRC) reconfiguration information carrying identification information, wherein the identification information is configured to identify the one or more second UEs;
the first sending module 120 includes:
a first sending submodule, configured to send the network information of the one or more second UEs identified by the identification information to the base station.

In an embodiment, the identification information includes a sidelink identifier, wherein the sidelink identifier includes a sidelink layer 1 identifier, and/or a sidelink layer 2 identifier.

In an embodiment, the apparatus 100 further includes:
a third sending module 160, configured to send the RRC reconfiguration information carrying a network information sending instruction to the one or more second UEs, wherein the network information sending instruction is configured to instruct the one or more second UEs to send the network information;
the first receiving module 110 includes:
a third receiving submodule 113, configured to receive the network information respectively sent by the one or more second UEs in response to the network information sending instruction.

In an embodiment, the network information includes one of the following:
PLMN identities of the one or more second UEs in a connected state, and/or cell identities of cells to which the one or more second UEs in the connected state are connected, and/or radio signal measurement results of the one or more second UEs in the connected state for connected cells;
PLMN identities of the one or more second UEs in an idle state, and/or cell identities of cells where the one or more second UEs in the idle state reside, and/or radio signal measurement results of the one or more second UEs in the idle state for the cells where they reside;
PLMN identities of the one or more second UEs in an inactive state, and/or cell identities of cells where the one or more second UEs in the inactive state reside, and/or radio signal measurement results of the one or more second UEs in the inactive state for the cells where they reside.

In an embodiment, the first working state includes a relay working state and/or a sidelink discontinuous reception working state;
the apparatus further includes at least one of the following:
a first communication module 170, configured to maintain communication with the base station through the at least one second UE in the relay working state;
a second communication module 180, configured to perform discontinuous reception with the at least one second UE in the sidelink discontinuous reception working state through a sidelink.

Figure 9:
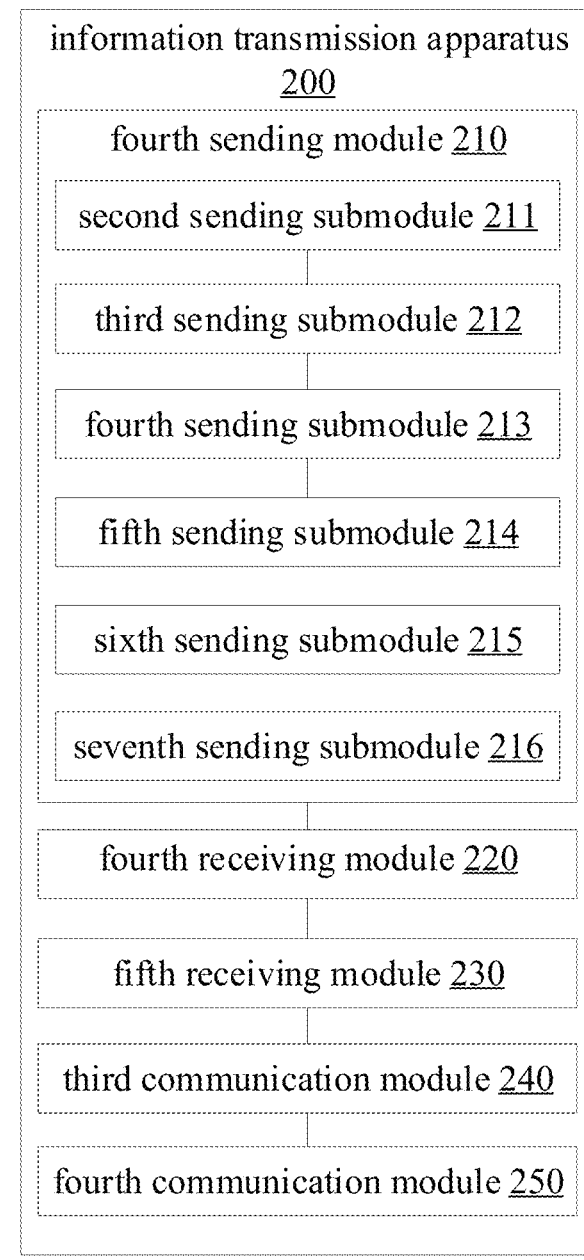
FIG. 9 is a block diagram of another information transmission apparatus according to an embodiment.

An embodiment of the present disclosure further provides an information transmission apparatus, which is applied to a second UE. FIG. 9 is a block diagram of an information transmission apparatus 200 provided in an embodiment of the present disclosure. As shown in FIG. 9, the apparatus 200 includes: a fourth sending module 210 and a fourth receiving module 220.

The fourth sending module 210 is configured to send network information associated with a network state of the second UE to a first UE.

The fourth receiving module 220 is configured to receive indication information from a base station, wherein the indication information is configured to instruct the second UE to operate in a first working state.

In an embodiment, the fourth sending module 210 includes:
a second sending submodule 211, configured to broadcast the network information to the first UE through a sidelink;
a third sending submodule 212, configured to unicast the network information to the first UE through a sidelink.

In an embodiment, the apparatus 200 further includes:
a fifth receiving module 230, configured to receive radio resource control (RRC) reconfiguration information carrying a network information sending instruction, wherein the network information sending instruction is configured to instruct the second UE to send the network information;
the fourth sending module 210 includes:
a fourth sending submodule 213, configured to send the network information associated with the network state of the second UE to the first UE according to the network information sending instruction.

In an embodiment, the fourth sending module 210 includes one of the following:
a fifth sending submodule 214, configured to, in response to the second UE being in a connected state, send a PLMN identity, and/or a cell identity of a cell to which the second UE is connected, and/or a radio signal measurement result of the second UE for the connected cell to the first UE;
a sixth sending submodule 215, configured to, in response to the second UE being in an idle state, send a PLMN identity, and/or a cell identity of a cell where the second UE resides, and/or a radio signal measurement result of the second UE for the cell where it resides;
a seventh sending submodule 216, configured to, in response to the second UE being in an inactive state, send a PLMN identity, and/or a cell identity of a cell where the second UE resides, and/or a radio signal measurement result of the second UE for the cell where it resides.

In an embodiment, the first working state includes a relay working state and/or a sidelink discontinuous reception working state;
the apparatus 200 further includes at least one of the following:
a third communication module 240, configured to relay communication between the first UE and the base station;
a fourth communication module 250, configured to perform discontinuous reception with the second UE.

In an embodiment, the network information is used to be sent via the first UE to the base station for the base station to select the second UE from one or more UEs.

Figure 10:
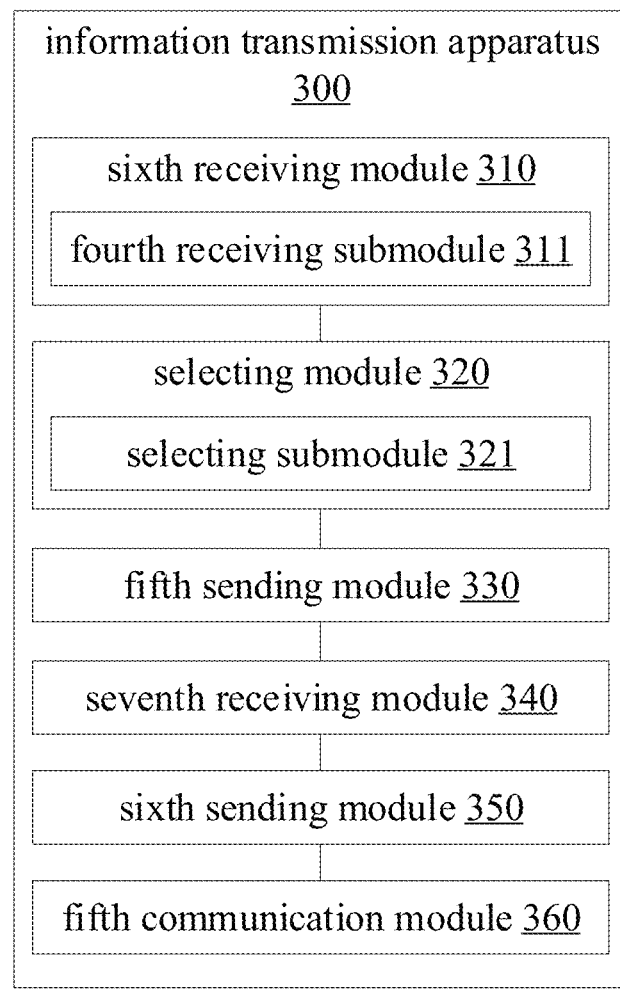
FIG. 10 is a block diagram of yet another information transmission apparatus according to an embodiment.

An embodiment of the present disclosure further provides an information transmission apparatus, which is applied to a base station. FIG. 10 is a block diagram of an information transmission apparatus 300 provided by an embodiment of the present disclosure. As shown in FIG. 10, the apparatus 300 includes: a sixth receiving module 310, a selecting module 320 and a fifth sending module 330.

The sixth receiving module 310 is configured to receive network information sent by a first UE and associated with network states of one or more second UEs.

The selecting module 320 is configured to select at least one second UE from the one or more second UEs to operate in a first working state, based on the network information.

The fifth sending module 330 is configured to send indication information, wherein the indication information is configured to instruct the at least one second UE to operate in the first working state.

In an embodiment, the apparatus 300 further includes:
a seventh receiving module 340, configured to receive sidelink radio signal measurement results of the one or more second UEs sent by the first UE;
the selecting module 320 includes:
a selecting submodule 321, configured to select the at least one second UE from the one or more second UEs to operate in the first working state, based on the network information and the sidelink radio signal measurement results.

In an embodiment, the apparatus 300 further includes:
a sixth sending module 350, configured to send radio resource control (RRC) reconfiguration information carrying identification information, wherein the identification information is configured to identify the one or more second UEs;
the sixth receiving module 310 includes:
a fourth receiving submodule 311, configured to receive the network information of the one or more second UEs identified by the identification information.

In an embodiment, the identification information includes a sidelink identifier, wherein the sidelink identifier includes a sidelink layer 1 identifier, and/or a sidelink layer 2 identifier.

In an embodiment, the RRC reconfiguration information further includes a network information sending instruction, wherein the RRC reconfiguration information is forwarded by the first UE to the one or more second UEs, wherein the network information sending instruction is configured to instruct the one or more second UEs to send the network information.

In an embodiment, the network information comprises one of the following:
PLMN identities of the one or more second UEs in a connected state, and/or cell identities of cells to which the one or more second UEs in the connected state are connected, and/or radio signal measurement results of the one or more second UEs in the connected state for connected cells;
PLMN identities of the one or more second UEs in an idle state, and/or cell identities of cells where the one or more second UEs in the idle state reside, and/or radio signal measurement results of the one or more second UEs in the idle state for the cells where they reside;
PLMN identities of the one or more second UEs in an inactive state, and/or cell identities of cells where the one or more second UEs in the inactive state reside, and/or radio signal measurement results of the one or more second UEs in the inactive state for the cells where they reside.

In an embodiment, the first working state includes a relay working state and/or a sidelink discontinuous reception working state;
the apparatus further includes a fifth communication module 360, configured to maintain communication with the first UE through the at least one second UE in the relay working state.

In an embodiment, the network information is received by the first UE from the one or more second UEs via a sidelink.

In an embodiment, the first receiving module 110, the first sending module 120, the second receiving module 130, the second sending module 140, the third receiving module 150, the third sending module 160, the first communication module 170, the second communication module 180, the fourth sending module 210, the fourth receiving module 220, the fifth receiving module 230, the third communication module 240, the fourth communication module 250, the sixth receiving module 310, the selecting module 320, the fifth sending module 330, the seventh receiving module 340, the sixth sending module 350, and the fifth communication module 360, etc. can be implemented by one or more central processing unit (CPU), graphics processing unit (GPU), baseband processor (BP), Application Specific Integrated Circuit (ASIC), DSP, Programmable Logic Device (PLD), Complex Programmable Logic Device (CPLD), Field-Programmable Gate Array (FPGA), general-purpose processor, controller, micro controller unit (MCU), microprocessor, or other electronic components, and may also be implemented in combination with one or more radio frequency (RF) antenna, for performing the aforementioned methods.

Figure 11:
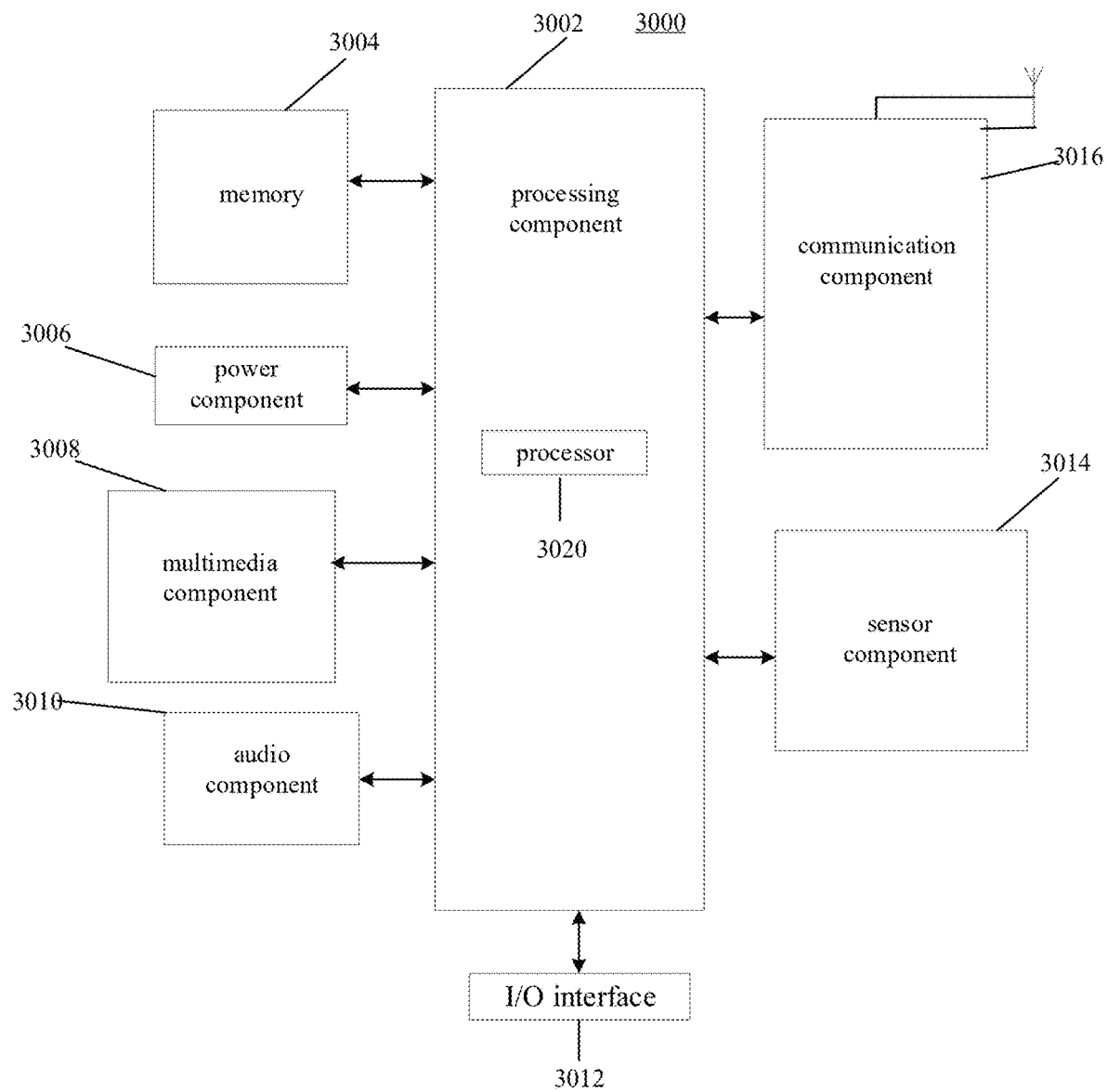
FIG. 11 is a block diagram of a device for information transmission according to an embodiment.

FIG. 11 is a block diagram of a device 3000 for information transmission according to an embodiment. For example, the device 3000 may be a mobile phone, a computer, a digital broadcast terminal, a messaging device, a gaming console, a tablet, a medical device, exercise equipment, a personal digital assistant, and the like.

Referring to FIG. 11, the device 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the device 3000, such as the operations associated with display, telephone calls, data communications, camera operations, and recording operations. The processing component 3002 may include one or more processors 820 to execute instructions to perform all or part of the steps in the above described methods. Moreover, the processing component 3002 may include one or more modules which facilitate the interaction between the processing component 3002 and other components. For instance, the processing component 3002 may include a multimedia module to facilitate the interaction between the multimedia component 3008 and the processing component 3002.

The memory 3004 is configured to store various types of data to support the operation of the device 3000. Examples of such data include instructions for any disclosures or methods operated on the device 3000, contact data, phonebook data, messages, pictures, video, etc. The memory 3004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3006 provides power to various components of the device 3000. The power component 3006 may include a power management system, one or more power sources, and any other components associated with the generation, management, and distribution of power in the device 3000.

The multimedia component 3008 includes a screen providing an output interface between the device 3000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3008 includes a front camera and/or a rear camera. The front camera and the rear camera may receive an external multimedia datum while the device 3000 is in an operation mode, such as a photographing mode or a video mode. Each of the front camera and the rear camera may be a fixed optical lens system or have focus and optical zoom capability.

The audio component 3010 is configured to output and/or input audio signals. For example, the audio component 3010 includes a microphone ("MIC") configured to receive an external audio signal when the device 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker to output audio signals.

The I/O interface 3012 provides an interface between the processing component 3002 and peripheral interface modules, such as a keyboard, a click wheel, buttons, and the like. The buttons may include, but are not limited to, a home button, a volume button, a starting button, and a locking button.

The sensor component 3014 includes one or more sensors to provide status assessments of various aspects of the device 3000. For instance, the sensor component 3014 may detect an open/closed status of the device 3000, relative positioning of components, e.g., the display and the keypad, of the device 3000, a change in position of the device 3000 or a component of the device 3000, a presence or absence of user contact with the device 3000, an orientation or an acceleration/deceleration of the device 3000, and a change in temperature of the device 3000. The sensor component 3014 may include a proximity sensor configured to detect the presence of nearby objects without any physical contact. The sensor component 3014 may also include a light sensor, such as a CMOS or CCD image sensor, for use in imaging disclosures. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the device 3000 and other devices. The device 3000 can access a wireless network based on a communication standard, such as WiFi, 2G, or 3G, or a combination thereof. In one embodiment, the communication component 3016 receives a broadcast signal or broadcast associated information from an external broadcast management system via a broadcast channel. In one embodiment, the communication component 3016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In embodiments, the device 3000 may be implemented with one or more disclosure specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In embodiments, there is also provided a non-transitory computer-readable storage medium including instructions, such as included in the memory 3004, executable by the processor 820 in the device 3000, for performing the above-described methods. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An information transmission method, comprising:
receiving, by a first user equipment (UE), one or more pieces of network information sent by one or more second UEs, wherein each piece of network information is associated with a network state of each second UE, each piece of network information comprises information of a cell where each second UE is located and a public land mobile network (PLMN) identity of each second UE;
sending, by the first UE, the one or more pieces of network information to a base station, wherein the one or more pieces of network information are used by the base station to select at least one second UE from the one or more second UEs;
receiving, by the first UE, first indication information sent by the base station, wherein the first indication information indicates the at least one second UE to operate in a first working state.

2. The method of claim 1, further comprising:
sending, by the first UE, a sidelink radio signal measurement result of the one or more second UEs to the base station.

3. The method of claim 1, wherein receiving the one or more pieces of network information sent by one or more second UEs comprises:
receiving, by the first UE, the one or more pieces of network information broadcast by the one or more second UEs through a sidelink.

4. The method of claim 1, further comprising:
receiving, by the first UE, radio resource control (RRC) reconfiguration information carrying identification information, wherein the identification information identifies the one or more second UEs;
sending the one or more pieces of network information to the base station comprises:
sending the one or more pieces of network information of the one or more second UEs identified by the identification information to the base station.

5. The method of claim 4, wherein the identification information comprises: a sidelink layer 2 identifier.

6. The method of claim 4, further comprising:
sending, by the first UE to the one or more second UEs, the RRC reconfiguration information carrying second indication information, wherein the second indication information indicates the one or more second UEs to send the one or more pieces of network information.

7. The method of claim 1, wherein the each piece of network information comprises at least one of:
a PLMN identity of each second UE in a connected state;
a cell identity of a cell connected with each second UE in the connected state;
a PLMN identity of each second UE in an idle state;
a cell identity of a cell resided by each second UE in the idle state;
a PLMN identity of each second UE in an inactive state; and
a cell identity of a cell resided by each second UE in the inactive state.

8. The method of claim 1, wherein the first working state is a relay working state;
the method further comprises:
maintaining communication with the base station through the at least one second UE in the relay working state.

9. A communication device, comprising a processor, a transceiver, a memory, and an executable program stored on the memory and capable of being run by the processor, wherein when the processor runs the executable program, steps of the information transmission method of claim 1 are implemented.

10. An information transmission method, comprising:
sending, by a second user equipment (UE), network information associated with a network state of the second UE to a first UE, wherein the network information comprises information of a cell where the second UE is located and a public land mobile network (PLMN) identity of the second UE; wherein the network information is sent to a base station via the first UE, so that the base station selects the second UE from one or more UEs; and
receiving, by the second UE, first indication information from a base station, wherein the first indication information indicates the second UE to operate in a first working state.

11. The method of claim 10, comprising:
broadcasting, by the second UE, the network information to the first UE through a sidelink.

12. The method of claim 10, further comprising:
receiving, by the second UE, radio resource control (RRC) reconfiguration information carrying second indication information, wherein the second indication information indicates the second UE to send the network information.

13. The method of claim 10, wherein the network information comprises at least one of:

a PLMN identity of the second UE in a connected state;
a cell identity of a cell connected with the second UE in the connected state;
a PLMN identity of the second UE in an idle state;
a cell identity of a cell resided by the second UE in the idle state;
a PLMN identity of the second UE in an inactive state; and
a cell identity of a cell resided by the second UE in the inactive state.

14. The method of claim 10, wherein the first working state is a relay working state;
the method further comprises:
relaying communication between the first UE and the base station.

15. An information transmission method, comprising:
receiving, by a base station, one or more pieces of network information associated with one or more network states of one or more second UEs sent by a first UE, wherein each piece of network information comprises information of a cell where each second UE is located and a public land mobile network (PLMN) identity of each second UE;
selecting at least one second UE from the one or more second UEs based on the one or more pieces of network information; and
sending, by the base station, first indication information, wherein the first indication information indicates the at least one second UE to operate in a first working state.

16. The method of claim 15, further comprising:
receiving, by the base station, a sidelink radio signal measurement result of the one or more second UEs sent by the first UE.

17. The method of claim 15, further comprising:
sending, by the base station, radio resource control (RRC) reconfiguration information carrying identification information, wherein the identification information identifies the one or more second UEs.

18. The method of claim 17, wherein the identification information comprises a sidelink layer 2 identifier.

19. The method of claim 15, wherein each piece of network information comprises at least one of:
a PLMN identity of each second UE in a connected state;
a cell identity of a cell connected with each second UE in the connected state;
a PLMN identity of each second UE in an idle state;
a cell identity of a cell resided by each second UE in the idle state;
a PLMN identity of each second UE in an inactive state; and
a cell identity of a cell resided by each second UE in the inactive state.

20. The method of claim 15, wherein the first working state is a relay working state;
the method further comprises maintaining communication with the first UE through the at least one second UE in the relay working state.

* * * * *